United States Patent
Yamamoto et al.

(10) Patent No.: US 9,645,340 B2
(45) Date of Patent: *May 9, 2017

(54) OPTICAL FIBER CABLE

(71) Applicant: SUMITOMO ELECTRIC INDUSTRIES, LTD., Osaka-shi, Osaka (JP)

(72) Inventors: Yoshinori Yamamoto, Yokohama (JP); Masaaki Hirano, Yokohama (JP); Masakazu Takami, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,094

(22) Filed: Oct. 14, 2016

(65) Prior Publication Data

US 2017/0031122 A1    Feb. 2, 2017

Related U.S. Application Data

(63) Continuation-in-part of application No. 15/084,784, filed on Mar. 30, 2016.

(30) Foreign Application Priority Data

Apr. 1, 2015    (JP) .................... 2015-075141

(51) Int. Cl.
G02B 6/44    (2006.01)
G02B 6/036    (2006.01)
G02B 6/02    (2006.01)

(52) U.S. Cl.
CPC ....... *G02B 6/4409* (2013.01); *G02B 6/02019* (2013.01); *G02B 6/02266* (2013.01); *G02B 6/03627* (2013.01); *G02B 6/4408* (2013.01)

(58) Field of Classification Search
CPC ............ G02B 6/02014; G02B 6/02019; G02B 6/02236; G02B 6/02266; G02B 6/03627;
(Continued)

(56) References Cited

U.S. PATENT DOCUMENTS

2001/0017967 A1*    8/2001    Hirano ............... G02B 6/02019
                                                385/123
2002/0106172 A1*    8/2002    Kato .................. G02B 6/02014
                                                385/127

(Continued)

FOREIGN PATENT DOCUMENTS

EP    0 503 469 A2    9/1992
EP    1 107 027 A1    6/2001

(Continued)

OTHER PUBLICATIONS

René-Jean Essiambre et al., "Capacity Limits of Optical Fiber Networks," Journal of Lightwave Technology, Feb. 15, 2010, pp. 662-701, vol. 28, No. 4.

(Continued)

*Primary Examiner* — Akm Enayet Ullah
*Assistant Examiner* — Michael Mooney
(74) *Attorney, Agent, or Firm* — Drinker Biddle & Reath LLP

(57) ABSTRACT

An optical fiber cable has a sectional area of Ac [mm$^2$] and housing a number N of optical fibers. A transmission loss $\alpha_{dB}$ [dB/km], a mode field diameter W [μm], an effective area Aeff [μm$^2$], an effective length $L_{eff}$ [km], and a wavelength dispersion D [ps/nm/km] of each of the optical fibers at a wavelength of 1550 nm satisfy a predetermined equation and the transmission loss of the optical fiber at the wavelength of 1550 nm is 0.19 dB/km or less, and the effective area of the optical fiber is in a range from 125 to 155 μm$^2$.

9 Claims, 12 Drawing Sheets

(58) Field of Classification Search
CPC .... G02B 6/03644; G02B 6/4403; G02B 6/4404; G02B 6/4409; G02B 6/4411; G02B 6/4429
USPC .................................. 385/100–114, 123–128
See application file for complete search history.

(56) References Cited

U.S. PATENT DOCUMENTS

| | | | |
|---|---|---|---|
| 2005/0089289 A1* | 4/2005 | Hayami | ............ C03B 37/01413 385/127 |
| 2005/0135760 A1 | 6/2005 | Bickham | |
| 2008/0181565 A1* | 7/2008 | Arashitani | ............... G02B 6/14 385/114 |
| 2013/0251320 A1 | 9/2013 | Hayashi | |
| 2014/0301704 A1* | 10/2014 | Tanaka | ................. G02B 6/4403 385/114 |
| 2015/0226914 A1 | 8/2015 | Hirano et al. | |
| 2016/0291278 A1 | 10/2016 | Yamamoto et al. | |

FOREIGN PATENT DOCUMENTS

| | | |
|---|---|---|
| EP | 1 154 294 A1 | 11/2001 |
| JP | 2014-067020 A | 4/2014 |
| WO | WO-2013/129234 A1 | 9/2013 |

OTHER PUBLICATIONS

M. Hirano et al., "Analytical OSNR Formulation Validated with 100G-WDM Experiments and Optimal Subsea Fiber Proposal," OFC/NFOEC Technical Digest, 2013, 3 pages.

* cited by examiner

FIG. 8

| FIBER | Δ0 [%] | Δ1 [%] | Δ2 [%] | 2a [μm] | 2b [μm] | TRANSMISSION LOSS [dB/km] | MFD [μm] | Aeff [μm²] | WAVELENGTH DISPERSION | CUTOFF WAVELENGTH [nm] |
|---|---|---|---|---|---|---|---|---|---|---|
| COMPARATIVE | 0.35 | 0.35 | - | 8.4 | - | 0.185 | 10.2 | 80 | 17 | 1260 |
| FIBER EXAMPLE 1 | 0.32 | 0.32 | -0.06 | 10.6 | 50.4 | 0.180 | 11.2 | 100 | 19 | 1420 |
| FIBER EXAMPLE 2 | 0.27 | 0.33 | -0.08 | 12.0 | 46.3 | 0.178 | 11.6 | 111 | 21 | 1510 |
| FIBER EXAMPLE 3 | 0.03 | 0.33 | -0.09 | 11.3 | 52.5 | 0.162 | 11.3 | 110 | 20 | 1480 |
| FIBER EXAMPLE 4 | 0.07 | 0.34 | -0.10 | 12.2 | 54.2 | 0.170 | 11.8 | 113 | 20 | 1550 |
| FIBER EXAMPLE 5 | 0.06 | 0.31 | -0.05 | 12.9 | 46.8 | 0.159 | 12.4 | 125 | 21 | 1540 |
| FIBER EXAMPLE 6 | 0.24 | 0.32 | -0.08 | 13.0 | 43.1 | 0.186 | 12.3 | 126 | 21 | 1580 |
| FIBER EXAMPLE 7 | 0.05 | 0.31 | -0.09 | 12.3 | 43.2 | 0.160 | 12.3 | 130 | 21 | 1480 |
| FIBER EXAMPLE 8 | 0.04 | 0.29 | -0.09 | 13.5 | 49.2 | 0.158 | 12.8 | 150 | 21 | 1530 |
| FIBER EXAMPLE 9 | 0.18 | 0.28 | -0.08 | 14.8 | 57.7 | 0.179 | 13.5 | 155 | 21 | 1500 |

FIG. 9

| | 40-CORE CABLE | | | | 100-CORE CABLE | | | | 200-CORE CABLE | | | | 300-CORE CABLE | | | |
|---|---|---|---|---|---|---|---|---|---|---|---|---|---|---|---|---|
| | SSE (lbs/12mm) | EQ (13) | EQ (14) | EQ (15) | SSE (lbs/12mm) | EQ (13) | EQ (14) | EQ (15) | SSE (lbs/12mm) | EQ (13) | EQ (14) | EQ (15) | SSE (lbs/12mm) | EQ (13) | EQ (14) | EQ (15) |
| FIBER EXAMPLE 1 | 2.0 | Y | Y | N | 3.6 | Y | Y | Y | 4.2 | Y | Y | N | 5.1 | Y | Y | N |
| FIBER EXAMPLE 2 | 2.1 | Y | Y | N | 3.7 | Y | Y | Y | 4.4 | Y | Y | N | 5.3 | Y | Y | N |
| FIBER EXAMPLE 3 | 2.2 | Y | Y | N | 4.0 | Y | Y | Y | 4.6 | Y | Y | Y | 5.6 | Y | Y | Y |
| FIBER EXAMPLE 4 | 2.2 | Y | Y | N | 3.9 | Y | Y | Y | 4.5 | Y | Y | Y | 5.4 | Y | Y | Y |
| FIBER EXAMPLE 5 | 2.3 | Y | Y | N | 4.1 | Y | Y | Y | 4.8 | Y | Y | Y | 5.7 | Y | Y | Y |
| FIBER EXAMPLE 6 | 2.1 | Y | Y | N | 3.7 | Y | Y | Y | 4.3 | Y | Y | N | 5.2 | Y | Y | N |
| FIBER EXAMPLE 7 | 2.3 | Y | Y | N | 4.2 | Y | Y | Y | 4.9 | Y | Y | Y | 5.9 | Y | Y | Y |
| FIBER EXAMPLE 8 | 2.2 | Y | Y | N | 3.9 | Y | Y | Y | 4.6 | Y | Y | Y | 5.3 | Y | Y | N |

FIG. 12

| | CABLE TYPE | NUMBER OF FIBERS | BOTTOM PORTION WIDTH OF SLOT [mm] | UPPER PORTION WIDTH OF SLOT [mm] | DEPTH OF SLOT [mm] | SECTIONAL AREA OF SLOT [mm²] | NUMBER OF FIBERS IN SLOT | Asbt [mm²/CORE] |
|---|---|---|---|---|---|---|---|---|
| CABLE EXAMPLE 1 | RIBBON SLOT TYPE | 100 | 1.5 | 1.4 | 1.95 | 2.5 | 20 | 0.13 |
| CABLE EXAMPLE 2 | RIBBON SLOT TYPE | 100 | 1.2 | 1.5 | 2.00 | 3.0 | 20 | 0.15 |

OPTICAL FIBER CABLE

CROSS-REFERENCE TO RELATED APPLICATIONS

This application is a continuation-in-part of application Ser. No. 15/084,784, filed on Mar. 30, 2016, for Optical Fiber Cable, which claims priority under 35 U.S.C. §119 to Japanese Patent Application No. 2015-075141, filed on Apr. 1, 2015. The contents of these applications are incorporated herein by reference in their entirety.

BACKGROUND OF THE INVENTION

Field of the Invention

The present invention relates to an optical fiber cable.

Description of the Related Art

With an optical communication system using an optical fiber arranged in a transmission line, it is desirable to transmit information in high volume. In general, since an optical wavelength band used for an optical communication system is limited to C band: 1530 to 1565 nm and L band: 1565 to 1610 nm, to transmit information in high volume, it is desirable that spectral efficiency (SE) [b/s/Hz] expressing a transmission capacity per frequency is high. Also, an optical fiber cable which includes and integrally covers a plurality of optical fibers is arranged in, for example, a conduit line placed underground. Since the space in the conduit line is limited, it is desirable to transmit information in higher volume with an optical fiber cable having a smaller sectional area. Spectral efficiency per unit sectional area of an optical fiber cable is expressed as a spatial spectral efficiency (SSE) [b/s/Hz/mm²].

Japanese Unexamined Patent Application Publication No. 2014-067020 discloses an optical fiber that improves an optical signal to noise ratio (OSNR) while taking account of high-density packing in an optical cable. Also, International Publication No. 2013/129234 discloses an optical fiber that increases SE per unit sectional area of an optical fiber. With the optical fiber described in Japanese Unexamined Patent Application Publication No. 2014-067020, an effective area Aeff is limited to 100 μm² or smaller. Also, SSE of the optical fiber cable is not considered. The optical fiber described in international Publication No. 2013/129234 is a multi-core optical fiber, but is not a single core fiber. Also, an optical fiber cable is not considered.

SUMMARY OF THE INVENTION

An object of the invention is to provide an optical fiber cable that increases SE per unit sectional area of the optical fiber cable.

An optical fiber cable according to an aspect of the invention has a sectional area of Ac [mm²] and including a number N of optical fibers. A transmission loss $\alpha_{dB}$[dB/km], a mode field diameter (MFD) W [μm], an effective area Aeff [μm²], an effective length $L_{eff}$ [km], and a wavelength dispersion D [ps/nm/km] of each of the optical fibers at a wavelength of 1550 nm satisfy Eq. (1):

$$\log_2\left[1 + 65.9 \cdot \left\{\exp\left(200 \cdot \left(\frac{\alpha_{dB} + 0.02}{4.343}\right)\right) \cdot \left(\frac{20 \times W}{W^2 + 104}\right)^{-4} \cdot A_{eff}^{-2} L_{eff} |D|^{-1} \cdot \operatorname{asinh}(629 \cdot |D| L_{eff}))^{-\frac{1}{3}}\right\}\right] \times \quad (1)$$

$$\frac{N}{A_C} \geq 0.008 \times N + 1.7,$$

wherein the transmission loss of the optical fiber at the wavelength of 1550 nm is 0.19 dB/km or less, and the Aeff of the optical fiber may be in a range from 125 to 155 μm².

In the optical fiber cable according to the aspect of the invention, the mode field diameter (MFD) of the optical fiber at the wavelength of 1550 nm may be in a range from 12.0 to 13.5 μm. The wavelength dispersion of the optical fiber at the wavelength of 1550 nm may be in a range from 19 to 22 ps/nm/km. The optical fiber may have a cutoff wavelength in a range from 1400 to 1600 nm.

The optical fiber included in the optical fiber cable according to the aspect of the invention may include a core and a cladding, a relative refractive index difference $$\frac{n_{core} - n_{cladding}}{n_{core}}$$

of the core with respect to the cladding may be in a range from 0.28% to 0.35%, and the core may have a diameter in a range from 12 to 15 μm. Alternatively, the optical fiber may include a core, an inner cladding, and an outer cladding, the outer cladding may have a refractive index that is smaller than a refractive index of the core and larger than a refractive index of the inner cladding, a relative refractive index difference $$\frac{n_{outer\ cladding} - n_{inner\ cladding}}{n_{outer\ cladding}}$$

of the outer cladding with respect to the inner cladding may be in a range from 0.05% to 0.10%, a relative refractive index difference $$\frac{n_{core} - n_{inner\ cladding}}{n_{core}}$$

of the core with respect to the inner cladding may be in a range from 0.28% to 0.35%, and the core may have a diameter in a range from 12 to 15 μm. A relative refractive index difference $$\frac{n_{core} - n_{pure\ silica}}{n_{pure\ silica}}$$

of the core with respect to pure silica may be in a range from −0.1% to +0.1%.

The optical fiber cable according to the aspect of the invention may be a ribbon slotted-core cable, and a value obtained by dividing a sectional area of a single slot by a number of the optical fibers housed in the single slot may be in a range from 0.12 to 0.16 mm²/core.

With the aspect of the invention, the optical fiber cable that increases SE per unit sectional area of the optical fiber cable can be provided.

BRIEF DESCRIPTION OF THE DRAWINGS

FIG. 8 is a table showing structures and optical characteristics at a wavelength of 1550 nm of optical fibers according to a comparative example and examples.

FIG. 9 is a table showing SSE when the optical fibers according to examples are housed in optical fiber cables.

FIG. 12 is a table showing slot sizes and other specifications of optical fiber cables according to examples.

DESCRIPTION OF THE PREFERRED EMBODIMENTS

Optical fiber cables according to an embodiment are described in detail with reference to the accompanying figures. It is to be noted that the identical reference sign is applied to the same elements in the description on the figures, and redundant description is omitted.

Figure 1:
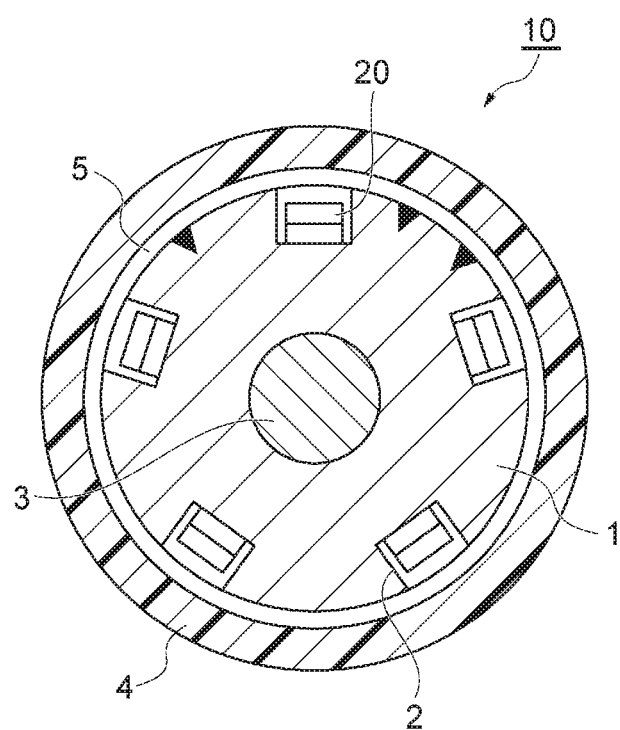
FIG. 1 is a cross-sectional view of an optical fiber cable according to an embodiment of the invention.
Figure 2:
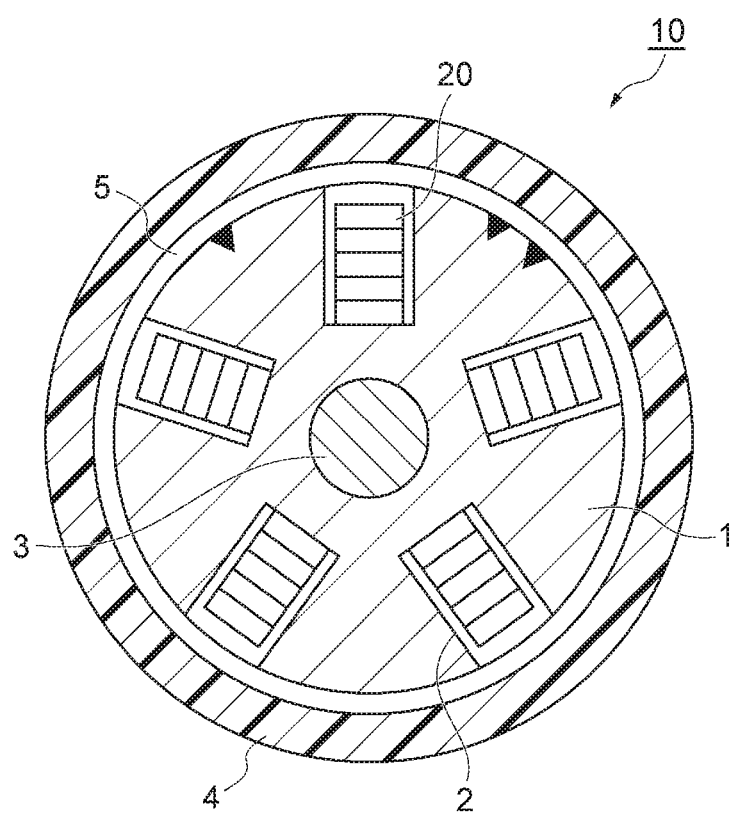
FIG. 2 is a cross-sectional view of an optical fiber cable according to an embodiment of the invention.
Figure 3:
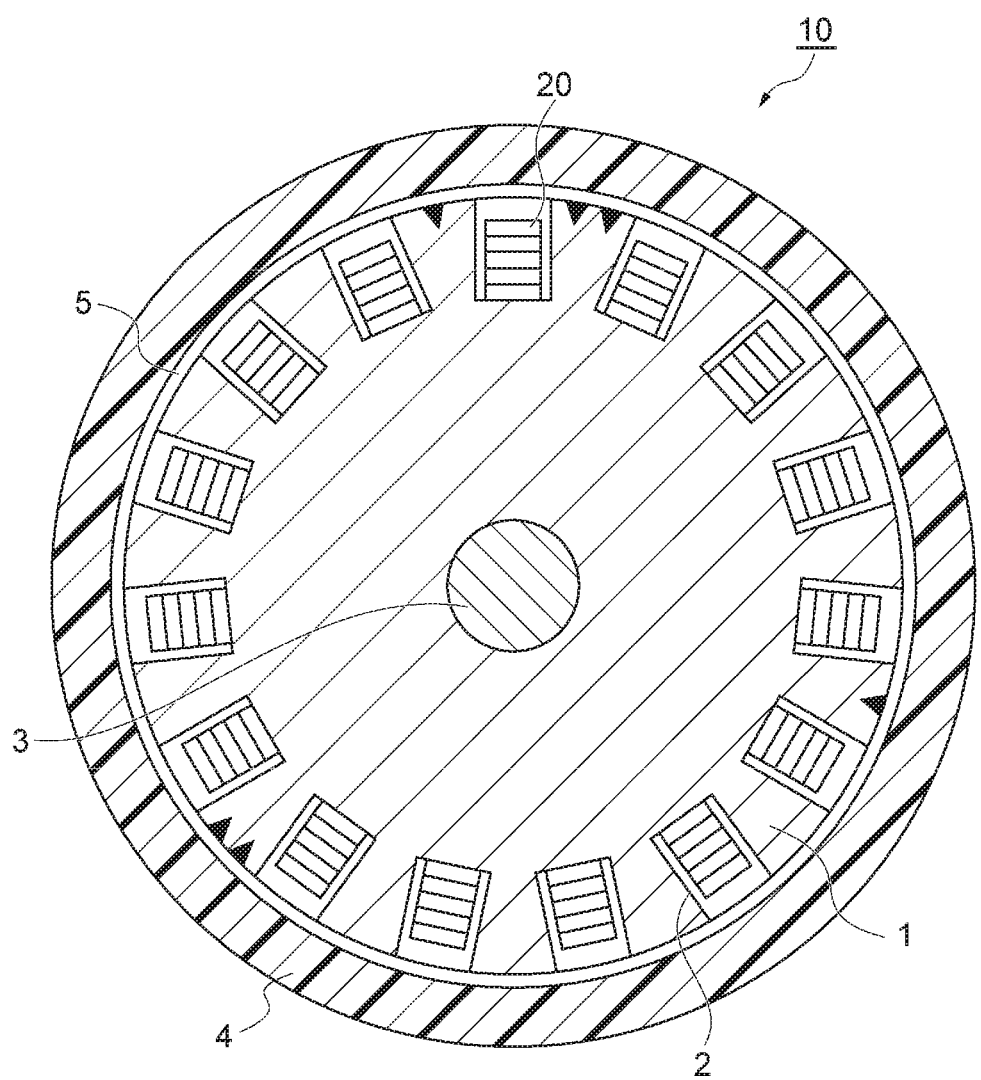
FIG. 3 is a cross-sectional view of an optical fiber cable according to an embodiment of the invention.
Figure 4:
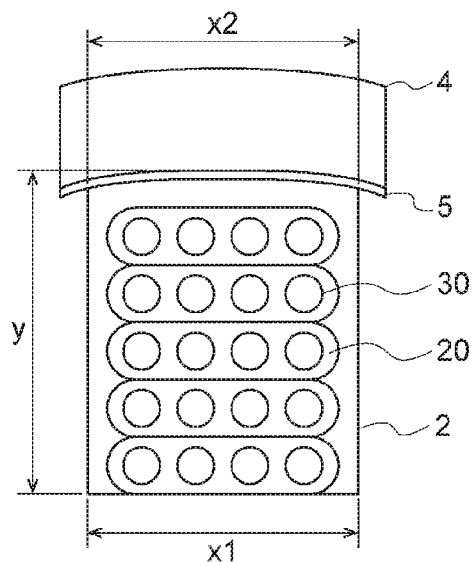
FIG. 4 is a cross-sectional vi an example of a slot included in each of the optical fiber cables in FIGS. 1 to 3.

FIGS. 1 to 3 are cross-sectional views of optical fiber cables 10 according to an embodiment of the invention. A structure of the optical fiber cables 10 is properly selected depending on the arrangement place and environment. Also, the number of optical fibers is determined depending on the total required transmission capacity and the space of the conduit. In this case, FIG. 1, FIG. 2, and FIG. 3 show an optical fiber cable including 40 optical fibers, 100 optical fibers, and 300 optical fibers, respectively. Also, FIG. 4 is a cross-sectional view showing an example of a slot included in the optical fiber cable 10.

As shown in FIGS. 1 to 4, the optical fiber cable 10 is so-called ribbon slotted-core optical fiber cable. The optical fiber cable 10 includes a slotted core 1, a tension member 3, a sheath 4, a water seal tape 5, and a fiber ribbon 20.

The slotted core 1 is a resin rod made of, for example, a plastic having a substantially cylindrical shape. A slot 2 is engraved in the slotted core 1. The slot 2 is a groove for housing the fiber ribbon 20. A plurality of the slots 2 are provided in the outer peripheral surface of the slotted core 1 along the axial direction of the optical fiber cable 10. Five slots 2 are provided in each case of a cable having 40 optical fibers and 100 optical fibers, and fifteen slots are provided in a case of a cable having 300 optical fibers. The width of a bottom portion of the slot 2 is x1, the width of an upper portion of the slot 2 is x2, and the depth of the slot 2 is y. In FIG. 4, x1 equals to x2; however, x1 does not necessarily equal to x2.

The tension member 3 is arranged in a center portion of the slotted core 1, and is integrally provided with the slotted core 1. The tension member 3 is made of fiber reinforced plastic (FRP). For example, FRP is formed by impregnating bound tensile-strength fibers with matrix resin, and the matrix resin is hardened by thermosetting.

The water seal tape 5 is wound around the outer peripheral surface of the slotted core 1 to cover the slot 2, and functions as a binding tape. The water seal tape 5 prevents the fiber ribbon 20 from protruding out from the slot 2. Also, the water seal rape 5 is formed of a water absorbing material, and prevents water from running in the longitudinal direction of the optical fiber cable 10.

The sheath 4 is provided at an outermost peripheral portion of the optical fiber cable 10. For example, the sheath 4 is formed of a high-strength plastic. To be specific, the sheath 4 may use a high-strength plastic, such as polyethylene, polyphenylene sulfide, polyether sulfon, polyether etherketone, or liquid crystal polymer. The sheath 4 is formed by extruding a high-intensity plastic on the outer periphery of the slotted core 1 covered with the water seal tape 5.

The fiber ribbon 20 includes a plurality of optical fibers 30 arranged in parallel and integrated. In this embodiment, the fiber ribbon 20 is formed as a four fiber ribbon having integrated therein four optical fibers 30. The fiber ribbons 20 are stacked by, for example, two in a case of a cable having 40 optical fibers, and five in each case of a cable having 100 optical fibers and 300 optical fibers, and are housed in each slot 2.

In the optical fiber cable 10, a value $A_{slot}$ obtained by dividing the sectional area (x1+x2)×y/2 by the number of fiber $N_{slot}$ in a single slot, that is, $A_{slot}=(x1+x2)\times y/(2\times N_{slot})$ is set in a range from 0.12 to 0.16 mm$^2$/core.

The definition of SSE and SSE of an optical fiber cable of related art are described next, and then SSE of the optical fiber cable 10 and an optical fiber 30 according to this embodiment are described.

Definition of SSE

The limit of SE per one optical fiber can be obtained from the Shannon limit, and is expressed by Eq. (2):

$$SE=\log_2(1+SNR), \quad (2)$$

where SNR denotes a signal to noise ratio. The relationship between SNR and OSNR can be expressed by Eq. (3) as described in R. Essiambre et al, "Capacity Limits of Optical Fiber Networks," Journal of Lightwave Technology, Vol. 28, No. 4, pp. 662-701 (February, 2010):

$$SNR = \frac{2B_{ref}}{pR_s} OSNR, \quad (3)$$

where p equals 1 in a case without polarization multiplex, and p equals 2 in a case with polarization multiplex. Hereinafter, p equals 2. $R_s$ denotes a symbol rate, and $B_{ref}$ denotes a reference bandwidth of OSNR, $B_{ref}$ typically being 12.5 GHz (0.1 nm).

In an optical communication system using a digital coherent receiver, the maximum value of OSNR, $OSNR_{max}$, is expressed by Eqs. (4) to (8) as described in M. Hirano et al, "Analytical OSNR Formulation Validated with 100G-WDM Experiments and Optimal Subsea Fiber Proposal," OFC/NFOEC Technical Digest, OTu2B.6 (2013):

$$OSNR_{max} = \left\{ \frac{4}{27F^2\eta} \cdot \gamma^2 L_{eff} |D|^{-1} \cdot \exp(2\alpha L) \cdot A_{sp}^2 \right\}^{-\frac{1}{3}} \times N_s^{-1}, \quad (4)$$

$$N = NF \cdot h\nu \cdot B_{ref}, \quad (5)$$

$$\eta = \frac{8}{27} \cdot \frac{2\nu^2}{CB_{ch}^3} \cdot \operatorname{asinh}\left(\frac{\pi C |D| L_{eff} B_t^2}{4\nu^2}\right) \cdot B_{ref}, \quad (6)$$

$$\gamma = \frac{2\pi}{\lambda} \cdot \frac{n_2}{A_{eff}}, \quad (7)$$

and $$L_{eff} = \frac{1 - \exp(-\alpha L)}{\alpha}. \quad (8)$$

In the equations, γ denotes a nonlinear coefficient [1/W/km], D denotes a chromatic dispersion [ps/nm/km], α denotes a transmission loss [1/km], $n_2$ denotes a nonlinear refractive index [m²/W], and Aeff denotes an effective area [μm²] of an optical fiber. In a case of standard single-mode fiber (standard SMF), at a wavelength of 1550 nm, these values are set as follows: γ=1.2/W/km, D=17 ps/nm/km, α=0.047/km (0.185 dB/km), $n_2$=2.35×10⁻²⁰ m²/W, and Aeff=80 μm². Also, $L_{eff}$ denotes an effective length [km], L denotes a span length (a repeater interval) [km], $N_s$ denotes the number of spans, NF denotes a noise figure of a repeater (Erbium doped fiber amplifier, EDFA), h denotes a Planck's constant 6.63×10⁻³⁴ [Js], ν denotes a frequency [THz] of an optical signal, C denotes the speed of light 3×10⁸ [m/s], and $B_t$ denotes a wavelength division multiplexing (WDM) signal band [GHz]. $A_{sp}$ denotes a splice loss between the optical fiber and the repeaters at both ends of the span, and can be obtained from MFD of the optical fiber and standard SMF. If it is assumed that MFD of standard SMF at the wavelength of 1550 nm is 10.2 μm, $A_{sp}$ of the optical fiber with MFD being W [μm] can be substantially expressed as $[20 \times W/(W^2+104)]^2$.

In this case, for easier understanding, a case of transmitting a Nyquist WDM signal in a transmission line composed of only a transmission optical fiber and a repeater is assumed; however, this case is substantially established even in normal WDM transmission. With Eqs. (2) to (4), the limit of SE per one optical fiber is expressed by Eq. (9):

$$SE = \quad (9)$$

$$\log_2\left(1 + \frac{B_{ref}}{R_s} OSNR_{max}\right) = \log_2\left[1 + N_s^{-1} \cdot \left\{(NF \cdot h\nu \cdot \exp(\alpha L) \cdot A_{sp})^2 \cdot \gamma^2 L_{eff} |D|^{-1} \cdot \frac{4\nu^2}{C} \cdot \operatorname{asinh}\left(\frac{\pi C |D| L_{eff} B_t^2}{4\nu^2}\right)\right\}^{-\frac{1}{3}}\right].$$

Further, in a case of an optical fiber cable having a number N of fibers and a sectional area Ac [mm²], the limit of SSE is expressed by Eq. (10):

$$SSE = \log_2\left[1 + N_s^{-1} \cdot \left\{(NF \cdot h\nu \cdot \exp(\alpha L) \cdot A_{sp})^2 \cdot \gamma^2 L_{eff} |D|^{-1} \cdot \frac{4\nu^2}{C} \cdot \operatorname{asinh}\left(\frac{\pi C |D| L_{eff} B_t^2}{4\nu^2}\right)\right\}^{-\frac{1}{3}}\right] \times \frac{N}{A_C}. \quad (10)$$

If it is assumed that signal optical frequency ν=194 THz, noise figure NF=6 dB, span length L=100 km, number of spans $N_s$=15, and WDM signal band $B_t$=10 THz, and if it is assumed that pure silica core fiber $n_2$=2.2×10⁻²⁰ [m²/W], SSE can be rewritten by Eq. (11):

$$SSE = \log_2\left[1 + 65.9 \cdot \left\{\exp(200\alpha) \cdot \left(\frac{20 \times W}{W^2 + 104}\right)^{-4} \cdot A_{eff}^{-2} L_{eff} |D|^{-1} \cdot \operatorname{asinh}(629 \cdot |D| L_{eff})^{-\frac{1}{3}}\right\}\right] \times \frac{N}{A_C}. \quad (11)$$

SSE of Optical Fiber Cable of Related Art

A typical ribbon slotted-core optical fiber cable of related art has a cable diameter of about 12 mm in the case where the cable includes 40 fibers, about 17 mm in the case where the cable includes 100 fibers, and about 23 mm in the case where the cable includes 300 fibers. Also, an optical fiber housed in the optical fiber cable of related art uses standard SMF.

A transmission loss of an optical fiber cable is equivalent to a transmission loss of an optical fiber if a bending loss or a micro-bending loss is not added when the optical fiber is housed in the cable. However, some optical fiber may have a transmission loss which is increased by a bending loss or a micro-bending loss when the optical fiber is housed in the cable. Alternatively, a bending loss or a micro-bending loss when an optical fiber is wound around a small-diameter bobbin may be released and a transmission loss may be decreased. A difference between a transmission loss after standard SMF is housed in a typical ribbon slotted-core cable of related art and a transmission loss of standard SMF was 0.00 dB/km in average and +0.018 dB/km in maximum.

Then, if it is assumed that a value obtained by adding 0.02 dB/km to a transmission loss of the optical fiber (fiber transmission loss, fiber loss) serves as a transmission loss of a substantially standard optical fiber cable (cable transmission loss Eq. (11) can be rewritten into Eq. (12):

$$SSE = \log_2\left[1 + 65.9 \cdot \left\{\exp\left(200 \cdot \left(\frac{\alpha_{dB} + 0.02}{4.343}\right)\right) \cdot \left(\frac{20 \times W}{W^2 + 104}\right)^{-4} \cdot A_{eff}^{-2} L_{eff} |D|^{-1} \cdot \operatorname{asinh}(629 \cdot |D| L_{eff})^{-\frac{1}{3}}\right\}\right] \times \frac{N}{A_C}, \quad (12)$$

where the fiber transmission loss is $\alpha_{dB}$ [dB/km]. With Eq. (12), SSE when standard SMF is housed in the typical ribbon slotted-core optical fiber cable of related art is 1.5 b/s/Hz/mm² in the case where the cable includes 40 fibers, 1.9 b/s/Hz/mm² in the case where the cable includes 100 fibers, and 3.2 b/s/Hz/mm² in the case where the cable includes 300 fibers.

SSE of Optical Fiber Cable 10

In contrast, the optical fiber cable 10 has a cable diameter of about 11 mm, 13 mm, 17 mm, or 19 mm in the case where the cable includes 40 fibers, 100 fibers, 200 fibers, of 300 fibers respectively. The optical fiber cable 10 satisfies Eq. (13):

$$SSE \geq 0.008 \times N + 1.7, \quad (13)$$

where $\alpha_{dB}$ denotes a transmission loss [dB/km] of the optical fiber 30 as described above. With Eq. (13), SSE can be increased by 30% or more as compared with the ribbon slotted-core optical fiber cable of related art including the same number of standard SMFs. More preferably, Eq. (14) is satisfied:

$$SSE \geq 0.009 \times N + 2.0. \qquad (14)$$

Accordingly, SSE can be increased by 50% or more as compared with the ribbon slotted-core optical fiber cable of related art including the same number of standard SMFs. Further preferably, Eq. (15):

$$SSE \geq 0.011 \times N + 2.3 \qquad (15)$$

is satisfied. Accordingly, SSE can be increased by 75% or more as compared with the ribbon slotted-core optical fiber cable of related art including the same number of standard SMFs. It is to be noted that the left sides of Eqs. (13), (14), and (15) are the same as the right sides of Eq. (12).

Optical Fiber 30

The optical fiber 30 housed in the optical fiber cable 10 according to this embodiment is preferably a single core fiber for two reasons.

In a case of multi-core fiber, it is difficult to splice multi-core fibers of the same type with a low loss. When splicing is executed by using a fusion splicer, for example, misalignment in a range from about 0.2 to about 0.4 μm may be generated. In a multi-core fiber, since plural cores are housed in a single fiber, it is difficult to accurately align the axes of all cores. In general, the length of a single optical fiber cable arranged is in a range from about 1 to about 5 km. Hence, in a transmission line of a span length of 100 km, the number of same-type splicing portions is 20 to 100 portions per span. Owing to this, the total span loss is largely increased by the splice loss. Also, the multi-core fiber is connected to devices at both ends of the span, a device for branching each core is required, and the insertion loss thereof is added. Hence, the total loss is increased.

The optical fiber 30 preferably has the following features (1) to (5) at the wavelength of 1550 nm.

(1) The transmission loss is preferably 0.19 dB/km or less or 0.18 dB/kin or less. As the transmission loss is decreased. SSE can be increased. The transmission loss is more preferably 0.17 dB/km or less.

(2) Aeff is preferably in a range from 100 to 125 $\mu m^2$ or 125 to 155 $\mu m^2$. As Aeff is increased, γ is decreased. Hence, SSE can be increased. On the other hand, if Aeff is excessively increased, a confinement effect for propagation light in a core is decreased. Hence, the cable transmission loss becomes larger than that of standard SMF due to the bending loss and micro-bending loss when housed in the optical fiber cable 10.

Figure 5:
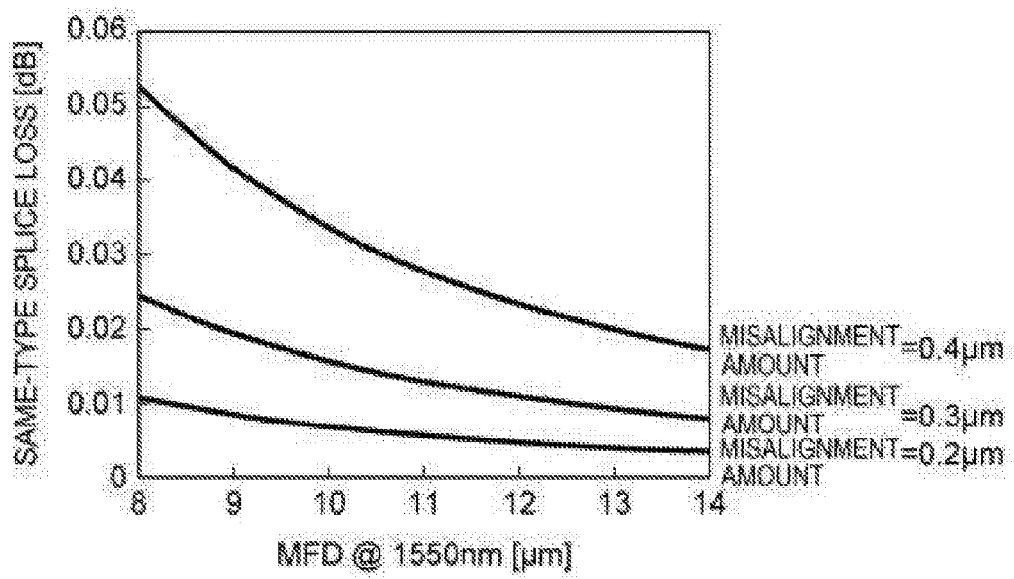
FIG. 5 is a graph showing the relationship between MFD and spliced loss when same-type optical fibers are spliced with each other.

(3) MFD is preferably in a range from 11.0 to 12.5 μm or 12.0 to 13.5 μm. When same-type optical fibers 30 are spliced by using a fusion splicer, for example, misalignment in a range from 0.2 to 0.4 μm may be generated. FIG. 5 is a graph showing the relationship between a same-type splice loss and MFD. The horizontal axis indicates MFD at the wavelength of 1550 nm, and the vertical axis indicates the splice loss when the same-type optical fibers 30 are spliced. As MFD is increased, the splice loss can be suppressed at a lower value even with misalignment. In contrast, if MFD is excessively increased, the splice loss with respect to standard SMF used as a pigtail of a repeater is increased.

(4) A dispersion is preferably in a range from 19 to 22 ps/nm/km. As the dispersion is increased, SSE can be increased.

(5) A fiber cutoff wavelength is preferably in a range from 1400 to 1600 nm. As the cutoff wavelength is increased, the bending loss can be suppressed at a lower value. The transmission loss after arrangement in the cable can be maintained at a lower value. However, if the cutoff wavelength is excessively increased, single-mode transmission is no longer executed.

Figure 6A:
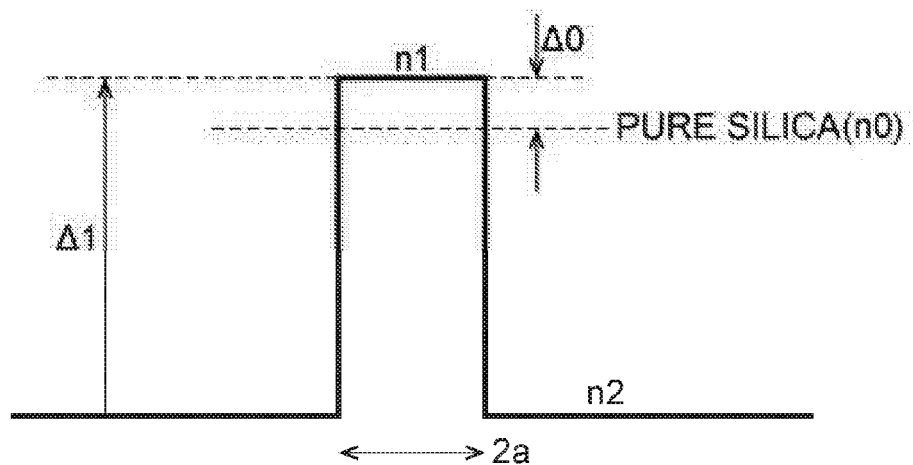
FIGS. 6A and 6B are conceptual diagrams showing refractive index profiles of optical fibers according to an embodiment of the invention.
Figure 6B:
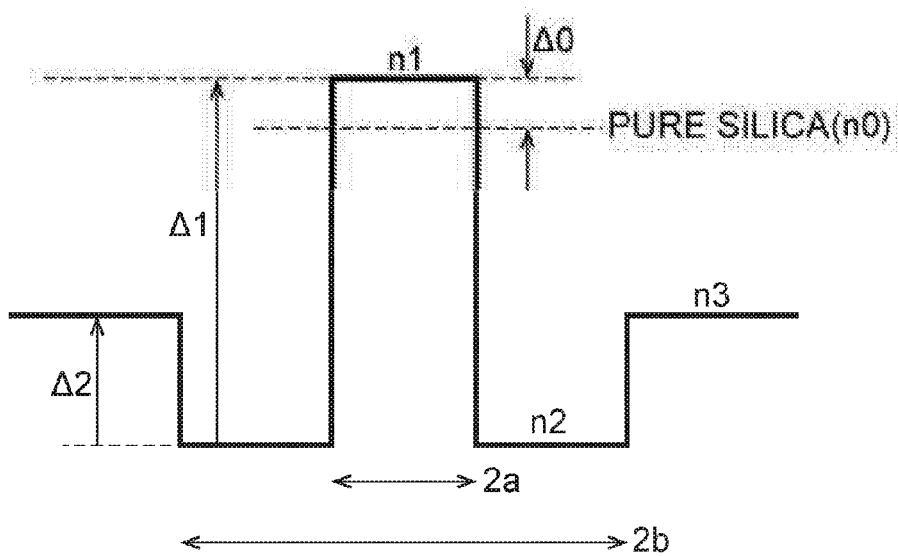
Figure 7A:
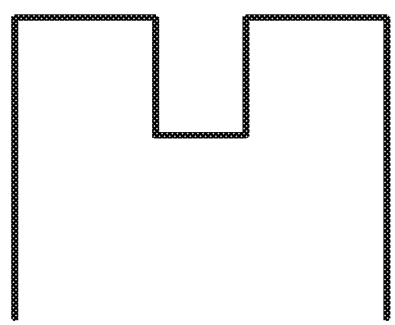
FIGS. 7A to 7F are conceptual diagrams showing index profiles of cores of optical fibers according to an embodiment of the invention.
Figure 7B:
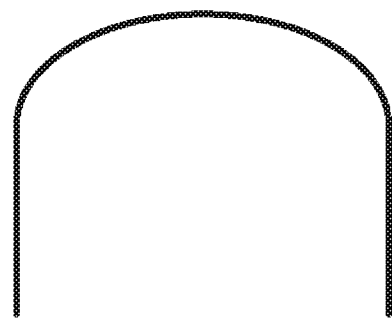
Figure 7C:
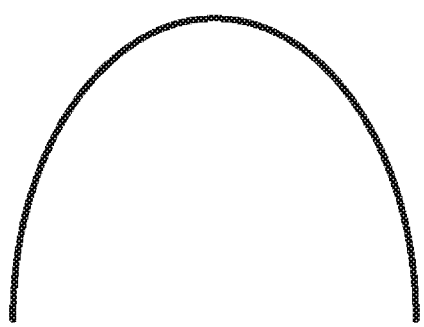
Figure 7D:
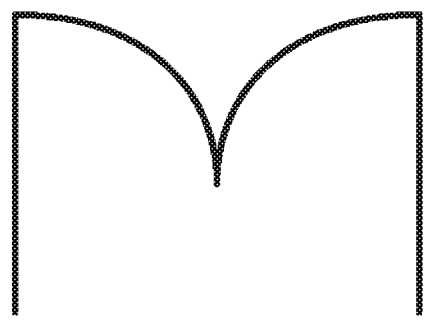
Figure 7E:
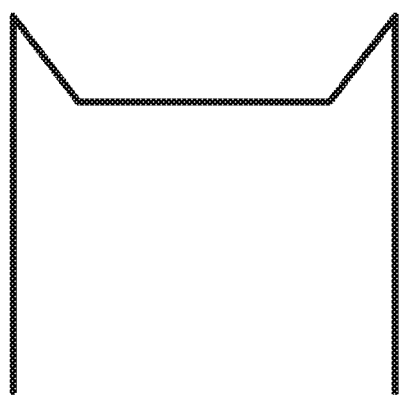
Figure 7F:
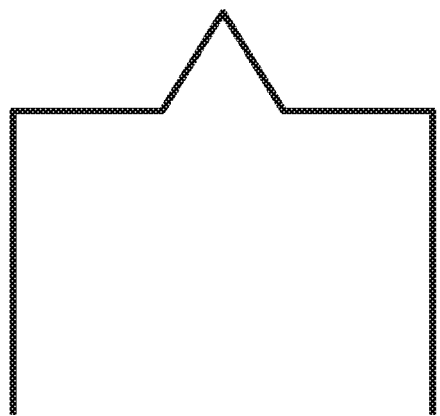
Figure 10A:
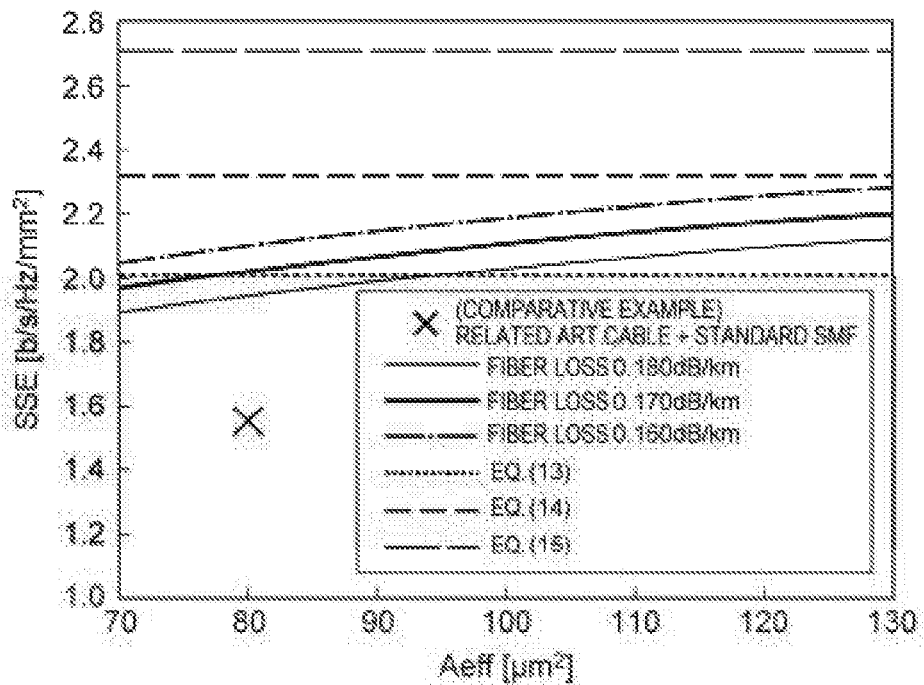
FIGS. 10A and 10B are graphs each showing the relationship between Aeff at a wavelength of 1.550 nm of an optical fiber and SSE of an optical fiber cable.
Figure 10B:
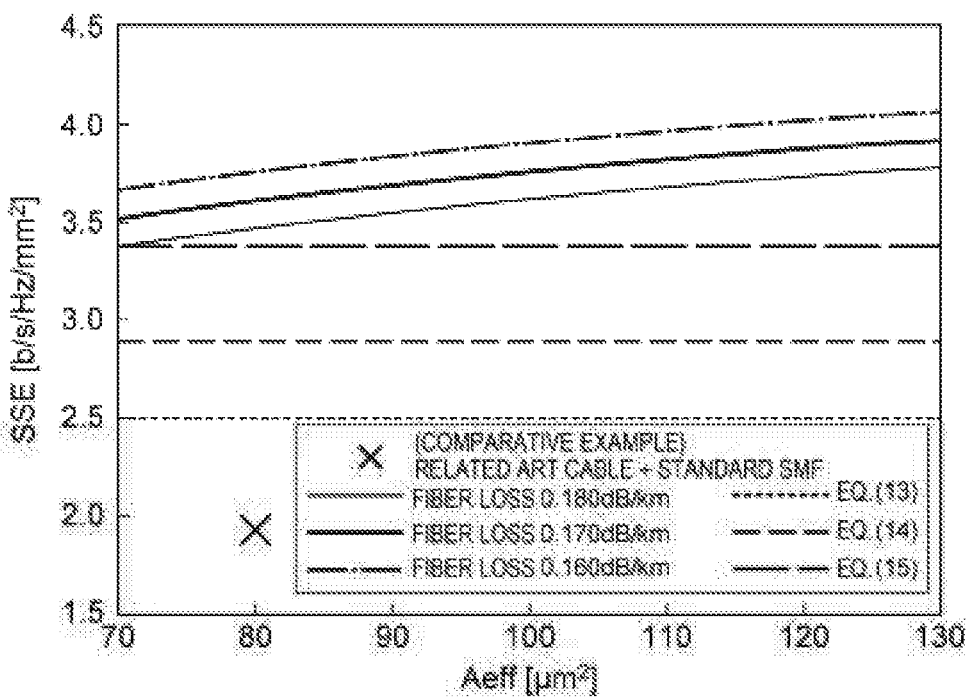
Figure 11A:
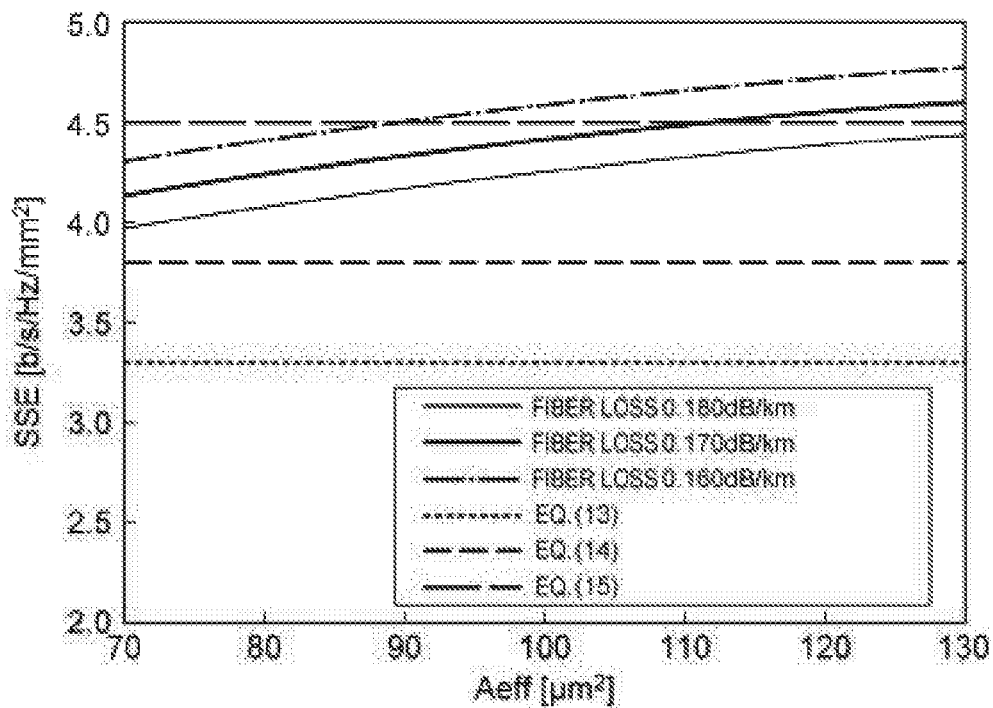
FIGS. 11A and 11B are graphs each showing the relationship between Aeff at a wavelength of 1550 nm of an optical fiber and SSE of an optical fiber cable.
Figure 11B:
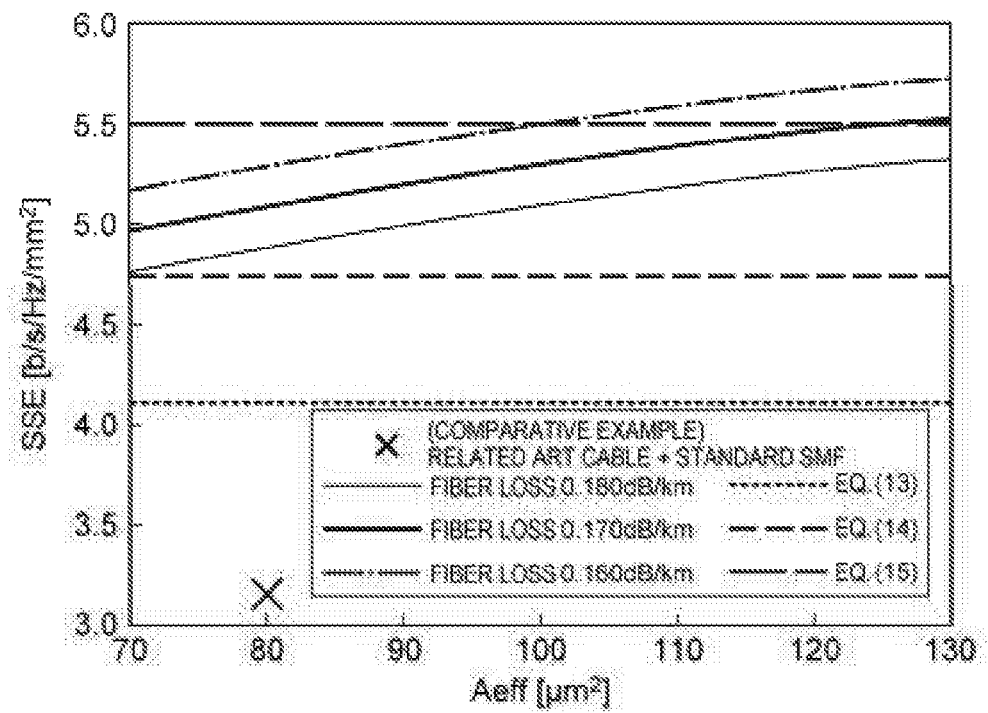

FIGS. 6A and 6B are conceptual diagrams showing refractive index profiles of optical fibers 30 according to the embodiment. As shown in FIG. 6A, one example of the optical fiber 30 includes a core having a refractive index n1 and a diameter 2a [μm], and a cladding having a refractive index n2. In this case, if it is assumed that a relative refractive index difference of the core with respect to a refractive index n0 of pure silica Δ0 [%] is 100×(n1−n0)/n1 and a relative refractive index difference of the core with respect to the cladding Δ1 [%] is 100×(n1−n2)/n1, Δ1 is preferably in a range from 0.30% to 0.35% or 0.28% to 0.35% and 2a is preferably in a range from 10 to 13 μm. Also, Δ0 is preferably in a range from −0.1% to +0.1%. It is effective not to substantially add a dopant to the core through which a major part of power of an optical signal propagates, in order to decrease the fiber transmission loss.

As shown in FIG. 6B, another example of the optical fiber 30 includes a core having a refractive index n1 and a diameter 2a [μm], an inner cladding having a refractive index n2 and a diameter 2b [μm], and an outer cladding having a refractive index n3. The optical fiber has a depressed cladding type refractive index profile being n1>n3>n2. Since the optical fiber 30 has the depressed cladding type refractive index profile, the bending loss can be suppressed at a relatively low value even when Aeff is increased. Hence, this example of the optical fiber 30 is preferable.

In this case, if it is assumed that a relative refractive index difference of the core with respect to the refractive index n0 of pure silica Δ0 [%] is 100×(n1−n0)/n1, a relative refractive index difference of the core with respect to the inner cladding is Δ1 [%]=100×(n1−n2)/n1, and a relative refractive index difference of the outer cladding with respect to the inner cladding is Δ2 [%]=100×(n3−n2)/n3, Δ1 is preferably in a range from 0.30% to 0.35% or 0.28% to 0.35%, Δ2 is preferably in a range from 0.05% to 0.10%, 2a is preferably in a range from 10 to 13 μm, and 2b is preferably in a range from 40 to 55 μm. Also, Δ0 is preferably in a range from −0.1% to +0.1%. It is effective not to substantially add a dopant to the core through which a major part of power of an optical signal propagates, in order to decrease the fiber transmission loss.

FIGS. 7A to 7F are illustrations showing index profiles of cores of optical fibers according to this embodiment, The index profile of the core of an optical fiber 30 can be modified in any one of various shapes. In this case, it is assumed that the average value of refractive indices of a core is n1.

As described above, the optical fiber cable 10 according to this embodiment houses the plurality of optical fibers 30 and satisfies Eq. (1). Accordingly, SSE of the optical fiber cable 10 can be increased by 30% as compared with the ribbon slotted-core fiber cable of related art housing a standard single-mode fiber (standard SMF) when the numbers of optical fibers are the same. Also, since the transmission loss of the optical fiber 30 at the wavelength of 1550 nm is 0.19 dB/km or less or 0.18 dB/km or less, and Aeff is in the range from 100 to 125 $\mu m^2$ or 125 to 155 $\mu m^2$, the transmission loss can be suppressed with an increased SSE value.

Also, since MFD of the optical fiber at the wavelength of 1550 nm is in the range from 11.0 to 12.5 μm or 12.0 to 13.5 μm, the splice loss between the same-type fibers can be suppressed at a low value even with misalignment, and the splice loss with respect to standard SMF used as the pigtail of the repeater can be suppressed at a low value. Also, since the dispersion of the optical fiber 30 at the wavelength of 1550 nm is in the range from 19 to 22 ps/nm/km, SSE can be increased. Also, since the cutoff wavelength of the optical fiber 30 is in the range from 1400 to 1600 nm, by increasing the cutoff wavelength of the optical fiber cable within a range available for single-mode transmission, the bending loss can be suppressed at a low value and the transmission loss of the optical fiber in the cable can be maintained at a low value.

Also, in the one example of the optical fiber cable 10, the optical fiber 30 includes the core and the cladding layer, the relative refractive index difference Δ1 of the core with respect to the cladding is in the range from 0.30% to 0.35% or 0.28% to 0.35%, and the diameter 2a of the core is in the range from 10 to 13 μm or 12.0 to 13.5 μm. Accordingly, SSE of the optical fiber cable 10 can be increased.

Also, in the other example of the optical fiber cable 10, the optical fiber 30 includes the core, the inner cladding, and the outer cladding. The refractive index n3 of the outer cladding is smaller than the refractive index n1 of the core and is larger than the refractive index n2 of the inner cladding. The relative refractive index difference Δ2 of the outer cladding with respect to the inner cladding is in the range from 0.05% to 0.10%, the relative refractive index difference Δ1 of the core with respect to the inner cladding is in the range from 0.30% to 0.35% or 0.28% to 0.35%, and the diameter 2a of the core is in the range from 10 to 13 μm or 12.0 to 13.5 μm. Accordingly, even if Aeff is increased, the bending loss can be suppressed at a relatively low value, and SSE of the optical fiber cable can be increased.

Also, since the relative refractive index difference Δ0 of the core with respect to pure silica is in the range from −0.1% to +0.1%, and a dopant is not substantially added to the core through which the major part of the power of the optical signal propagates, the transmission loss of the optical fiber 30 can be decreased.

Also, the optical fiber cable 10 is the ribbon slotted-core cable. The value $A_{slot}$ obtained by dividing the sectional area of the single slot 2 by the number of optical fibers $N_{slot}$ housed in the single slot 2 is in the range from 0.12 to 0.16 mm²/core. If the sectional area (x1+x2)×y/2 of the slot 2 is decreased, the sectional area of the cable can be decreased. This is advantageous to increase SSE of the optical fiber cable 10. However, if the sectional area of the slot 2 is excessively decreased, the clearance with respect to the fiber ribbon 20 is decreased. Accordingly, the fiber ribbon 20 contacts the inner wall of the slot 2, and the bending loss and micro-bending loss are generated by the stress of the optical fiber 30. Consequently, the loss is increased more than the loss of the cable of related art, and SSE is decreased. Particularly in a case of an optical fiber having Aeff being larger than that of standard SMF like the optical fiber 30 according to this embodiment, the confinement for the propagation light in the core is weakened, and the bending loss and micro-bending loss are likely generated. In this embodiment, since $A_{slot}$ is determined within the predetermined range, even if the above-described optical fiber 30 is housed, the sectional area of the cable can be decreased while the difference in transmission loss between the optical fiber 30 and the optical fiber cable 10 is suppressed to be equivalent to a case in which standard SMF is housed in the typical ribbon slotted-core cable of related art. Consequently, SSE of the optical fiber cable 10 can be increased.

Also, the optical fiber cable 10 is the ribbon slotted-core cable, the value $A_{slot}$ obtained by dividing the sectional area of the single slot 2 by the number of optical fibers $N_{slot}$ housed in the single slot 2 is in the range from 0.12 to 0.16 mm²/core, the transmission loss of the optical fiber 30 at the wavelength of 15.50 nm is 0.19 dB/km or lower or 0.18 dB/km or lower, and Aeff is in the range from 100 to 125 μm² or 125 to 155 μm². In this case, as described above, since $A_{slot}$ is determined within the predetermined range, even if the above-described optical fiber 30 is housed, the sectional area of the cable can be decreased while the difference in transmission loss between the optical fiber 30 and the optical fiber cable 10 is suppressed to be equivalent to the case in which standard SMF is housed in the typical ribbon slotted-core cable of related art. Consequently, SSE of the optical fiber cable 10 can be increased. Also, the transmission loss can be suppressed with an increased SSE value.

Next, specific examples of the optical fiber according to this embodiment are described in comparison with a comparative example. An optical fiber according to Example 1 was an optical fiber having a refractive index profile as shown in FIG. 6A. Optical fibers according to Examples 2 to 5 were optical fibers each having a depressed cladding type refractive index profile as shown in FIG. 6B. An optical fiber according to the comparative example was standard SMF.

FIG. 8 is a table showing structures of optical fibers and optical characteristics at the wavelength of 1550 nm according to the comparative example and the examples. FIG. 9 is a table showing SSE when the optical fibers according to the examples were housed in optical fiber cables. The difference between the cable transmission loss when the optical fiber according to any one of the examples was housed in the optical fiber cable according to the embodiment of the invention and the transmission loss shown in FIG. 8 was 0.02 dB/km or less even at maximum, which is substantially equivalent to a case in which standard SMF is housed in the typical ribbon slotted-core cable of related art. Hence, similarly to the case in which standard SMF is housed in the typical ribbon slotted-core cable of related art, SSE was obtained from Eq. (11) while the value obtained by adding 0.02 dB/km to the fiber transmission loss was treated as a substantially standard cable transmission loss. In FIG. 9, "Y" was applied if obtained SSE satisfied Eqs. (13) to (15), and "N" was applied if obtained SSE did not satisfy Eqs. (13) to (15).

FIGS. 10A, 10B, 11A, and 11B are graphs each showing the relationship between Aeff of an optical fiber at the wavelength of 1550 nm and SSE of an optical fiber cable. FIGS. 10A, 10B, 11A, and 11B shows the cases in which the optical fiber cable includes 40 fibers, 100 fibers 200 fibers, and 300 fibers, respectively. Each figure shows the relationship between Aeff of the optical fiber at the wavelength of 1550 nm and SSE of the optical fiber cable, for each of cases of fiber transmission losses being 0.180, 0.170, and 0.160 dB/km. Also, each figure shows the values of the right sides in Eqs. (13) to (15).

In the range of Aeff from 70 to 125 μm², the difference in transmission loss between the cable and the fiber is 0.02 dB/km or smaller even at maximum, and similarly to the case in which standard SMF is housed in the typical ribbon slotted-core cable of related art, the value obtained by adding 0.02 dB/km to the fiber transmission loss is treated as a substantially standard cable transmission loss. Referring to FIGS. 10A, 10B, 11A, and 11B, as long as Aeff is 100 μm² or larger and the fiber transmission loss is 0.180 dB/km or lower, Eq. (13) can be satisfied.

FIG. 12 is a table showing slot sizes and other specifications of optical fiber cables according to examples. As shown in FIG. 12, with the optical fiber cable according to any one of the examples, $A_{slot}$ is set in the range from 0.12 to 0.16 mm²/core. Accordingly, even when the optical fiber is housed, the sectional area of the cable can be decreased while the difference in transmission loss between the optical fiber and the optical fiber cable is suppressed to be equivalent to the case in which standard SMF is housed in the typical ribbon slotted-core cable of related art.

What is claimed is:

1. An optical fiber cable having a sectional area of Ac [mm²] and housing a number N of optical fibers,
   wherein a transmission loss $\alpha_{dB}$ [dB/km], a mode field diameter W [μm], an effective area Aeff [μm²], an effective length $L_{eff}$ [km], and a wavelength dispersion D [ps/nm/km] of each of the optical fibers at a wavelength of 1550 nm satisfy Equation (1), $$\log_2\left[1 + 65.9 \cdot \left\{\exp\left(200 \cdot \left(\frac{\alpha_{dB} + 0.02}{4.343}\right)\right) \cdot \left(\frac{20 \times W}{W^2 + 104}\right)^{-4} \cdot A_{eff}^{-2} L_{eff} |D|^{-1} \cdot \operatorname{asinh}(629 \cdot |D| L_{eff})\right\}^{-\frac{1}{3}}\right] \times \frac{N}{A_C} \geq 0.008 \times N + 1.7 \quad (1)$$

wherein the transmission loss of the optical fiber at the wavelength of 1550 nm is 0.19 dB/km or less, and the effective area of the optical fiber is in a range from 125 to 155 μm².

2. The optical fiber cable according to claim 1,
   wherein the mode field diameter of the optical fiber at the wavelength of 1550 nm is in a range from 12.0 to 13.5 μm.

3. The optical fiber cable according to claim 1,
   wherein the wavelength dispersion of the optical fiber at the wavelength of 1550 nm is in a range from 19 to 22 ps/nm/km.

4. The optical fiber cable according to claim 1,
   wherein the optical fiber has a cutoff wavelength in a range from 1400 to 1600 nm.

5. The optical fiber cable according to claim 1,
   wherein the optical fiber comprises:
   a core having a diameter in a range from 12 to 15 μm; and
   a cladding surrounding the core and having a refractive index that is smaller than a refractive index of the core,
   wherein a relative refractive index difference of the core with respect to the cladding is in a range from 0.28% to 0.35%.

6. The optical fiber cable according to claim 5,
   wherein a relative refractive index difference of the core with respect to pure silica is in a range from −0.1% to +0.1%.

7. The optical fiber cable according to claim 1,
   wherein the optical fiber comprises:
   a core having a diameter in a range from 12 to 15 μm;
   an inner cladding surrounding the core and having a refractive index that is smaller than a refractive index of the core; and
   an outer cladding having a refractive index that is smaller than a refractive index of the core and larger than a refractive index of the inner cladding,
   wherein a relative refractive index difference of the outer cladding with respect to the inner cladding is in a range from 0.05% to 0.10%, and a relative refractive index difference of the core with respect to the inner cladding is in a range from 0.28% to 0.35%.

8. The optical fiber cable according to claim 7,
   wherein a relative refractive index difference of the core with respect to pure silica is in a range from −0.1% to +0.1%.

9. The optical fiber cable according to claim 1,
   wherein the optical fiber cable is a ribbon slotted-core cable, and
   wherein a value obtained by dividing a sectional area of a single slot by a number of cores of the optical fibers housed in the single slot is in a range from 0.12 to 0.16 mm²/core.

* * * * *